2,803,053

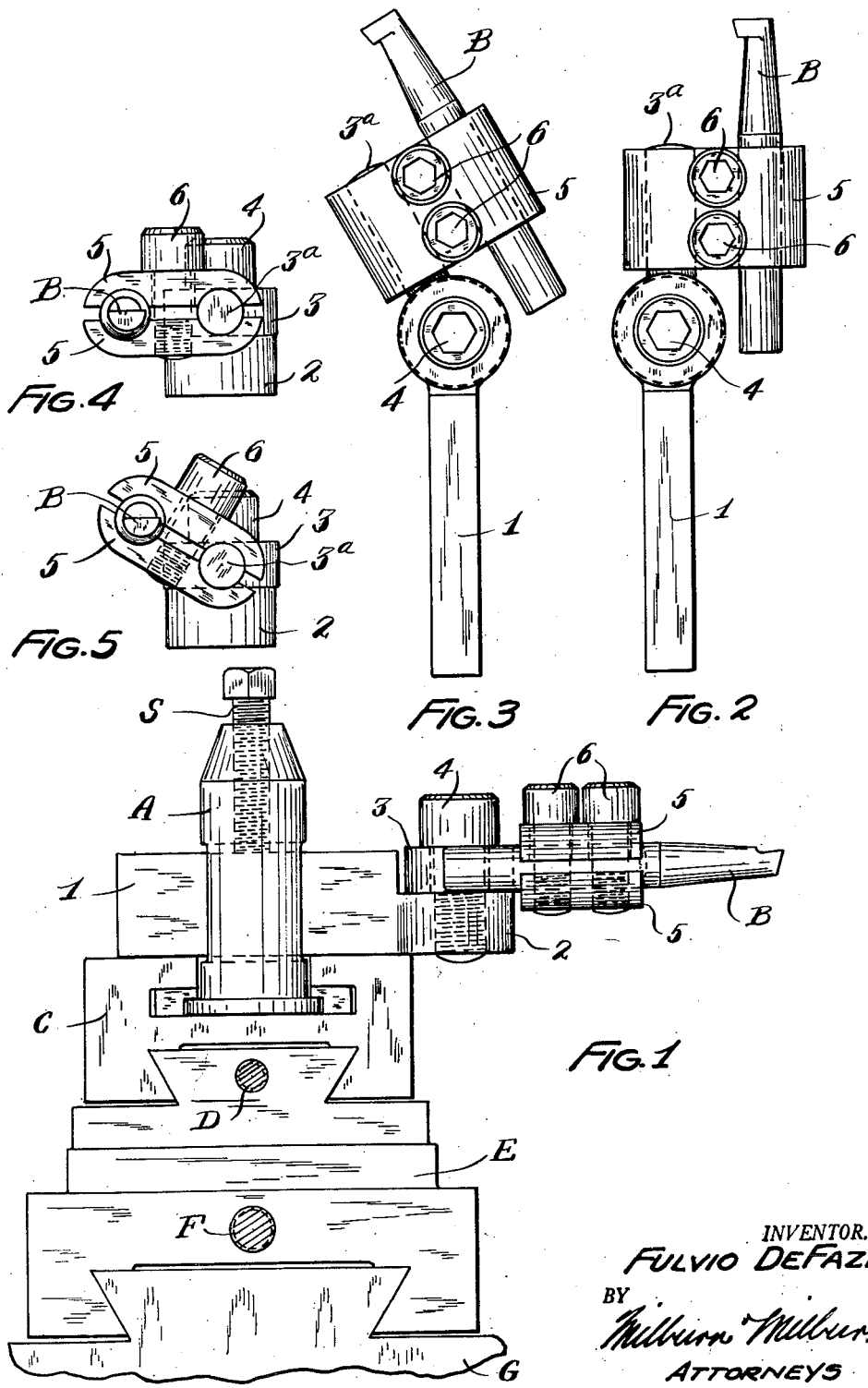

ADJUSTABLE TOOLHOLDER

Fulvio De Fazi, Cleveland, Ohio

Application June 1, 1953, Serial No. 358,861

1 Claim. (Cl. 29—98)

This invention is for an improved tool holder that is adapted to be installed for use upon a lathe or the like, especially a small lathe.

In the art of lathes, for instance, as is of course well understood, such a machine includes what is commonly known as a "rocker" comprising interengaging spherical surfaces that are intended to permit adjustment of the tool post in vertical planes in the direction of travel of the tool as well as transversely thereof. However, there is always the danger of foreign matter becoming lodged between the interengaging surfaces of the rocker parts so as to seriously interfere with its operation in the manner intended and the setting of such adjustment is not sufficiently secure to be altogether dependable.

Accordingly, it is the object of my present invention to provide a tool holder with means for allowing the desired adjustments but without the objection above mentioned.

A further object of my present invention is to provide such a device in the form of an attachment that is of simple construction and can be readily applied to a lathe or the like and adjusted in the manner desired.

It is also understood of course that the conventional lathe includes a tool post A upon which the tool B is adapted to be mounted and which is capable of adjustment rotatably about a vertical axis and may be secured in such adjusted position by means of the regular screw S; and it is likewise understood that in the conventional lathe the support C for the tool post A is capable of straight-line movement transversely of the length of the lathe by means of the familiar operatable screw D and that the slide E, upon which the support C is mounted, is also capable of transverse adjustment by means of the familiar operatable screw F, while the carriage G is capable of lengthwise movement in a conventional manner, not here illustrated, for the cutting operation by the tool B in any given case.

Needless to explain, it is contemplated that during the cutting operation, the axial centre of the tool B will parallel the longitudinal centre line between the tail stock and the head stock of the lathe for instance; and my present improvement is intended to facilitate establishing and maintaining this operative relationship under all conditions, regardless of the angle of the tool post with respect to the lathe carriage and regardless of the vertical and/or horizontal adjustment that might be required for the cutting tool B in order to accomplish this relationship.

Other objects will appear from the following description and claim when considered together with the accompanying drawing.

Fig. 1 illustrates the manner of assembly of my present improved device in a lathe which is here shown in only a partial manner;

Fig. 2 and Fig. 3 are top plan views of my present device and illustrate two different positions of adjustment;

Figs. 4 and 5 are end elevations thereof and show two different adjustments about a horizontal axis whereas the adjustments indicated in Figs. 2 and 3 are about a vertical axis.

It is to be understood that the present form of disclosure is merely for the purpose of illustration and that there might be devised other variations thereof without departing from the spirit of my invention as herein set forth and claimed.

Referring now in detail to my present attachment as shown in the accompanying drawing, the rectangular arm 1 is adapted to be extended through the correspondingly formed aperture in the tool post A and may be securely clamped in such position in the regular manner. The end of the arm 1 has a projection 2 with a smooth flat upper surface upon which is supported the companion smooth surface of the rear part 3 of an intermediate member; this intermediate member being adapted to be secured by the screw 4 in any desired position of adjustment about a vertical axis. The intermediate member has a cylindrical extension 3a which is adapted to extend through a correspondingly shaped opening that is provided between the companion duplicate members 5 which are adapted also for holding the tool B in the parallel opening also provided between these companion jaw members 5. The parallel openings that are provided between the members 5 may be of the same form in cross section and of the same size so as to render these members of duplicate nature although this is not absolutely necessary but rather a matter of convenience in the manufacture of these parts. The members 5 may be secured in clamping position by means of the screws 6 that are located midway of the length thereof so as to hold the tool B in position and also to hold the members 5 in adjusted position about the horizontal axis of its supporting projection 3a.

In the actual use of this device after having been installed upon the tool post A of the conventional lathe, for instance, let us suppose that the tool post A has been set in such a manner that the tool B extends at an angle to the axial centre between the head stock and the tail stock of the lathe. In such a case the direction of the tool B may be readily adjusted to position parallel to the axial centre of the machine after loosening the screw 4, whereupon such adjusted position may be secured by tightening the screw 4. Then the elevation of the tool B may be raised or lowered by turning the tool holder 5 about its horizontal axis and then securing the same in such adjusted position, this being accomplished by means of the screws 6. If there then be required any adjustment of the tool B forwardly or rearwardly in order to compensate for the component of lateral movement in its curved path of movement about the axis of the extension 3a, as just referred to, such correction may be made quite readily by means of the regular straight-line adjustment of the tool post A or its support C either forwardly or rearwardly transversely of the lathe body.

It is also possible to adjust the position of the tool B itself in its holder 5, lengthwise thereof, by means of the screws 6 in case this might be necessary so that the rear end of the tool B will not strike against the arm 1 when the intermediate member and the tool holder 5 are adjusted about the vertical axis through the screw 4 in the event of such adjustment for the purpose as above explained.

Thus it will be seen that I have devised a simple form of structure that is capable of being manipulated very easily and in an efficient and dependable manner. With this present improvement there is eliminated the heretofore troublesome "rocker" and yet there may be obtained all of the required adjustments of the tool in order to establish and maintain its proper relation with respect to the centre of operation in the lathe or the like in which this device may be installed. Also, with this attachment the position of the tool holder 5 may be reversed by turning the same 180 degrees about its axis of adjustment; and the tool holder 5 may be turned over so as to have more convenient access to the screws 6, this being effected by turning over the tool holder 5 either longitudinally or transversely in the form of structure as herein illustrated. Another feature of advantage in my present device resides in the fact that, with the same means 6 for securing the tool B in position and for securing the adjustment of the tool holder about its horizontal axis, both of these adjustments may be effected at the same time and by the same single operation, thereby assuring the proper setting of the cutting face of the tool B with respect to the work at all times.

What I claim is:

An attachment for a lathe or the like, comprising an arm for supporting the same upon a lathe tool post or the like, said arm having a horizontally extending projection, an intermediate member including a portion pivotally mounted upon the outer end of said arm projection for adjustment about a vertical axis and having a horizontal extension, vertically positioned screw means for securing said intermediate member in adjusted position upon said arm projection, a tool holder comprising companion duplicate jaw members with parallel horizontally extending openings therethrough for reversibly mounting the same directly upon said extension of said intermediate member and for receiving the tool, and screw means located between said parallel openings for simultaneously clamping said tool holder in adjusted position and adjustably clamping the tool in said tool holder.

References Cited in the file of this patent

UNITED STATES PATENTS

| | | |
|---|---|---|
| 776,250 | Mathieu | Nov. 29, 1904 |
| 938,600 | Lowe | Nov. 2, 1909 |
| 1,166,804 | Amborn | Jan. 4, 1916 |
| 1,282,984 | Thompson | Oct. 29, 1918 |
| 1,351,632 | Engels | Aug. 31, 1920 |
| 1,409,254 | Smith | Mar. 14, 1922 |
| 1,486,407 | Anthony | Mar. 11, 1924 |